Dec. 19, 1967     W. BAIST     3,358,495
APPARATUS FOR MEASURING THE WEAR ON
SURFACES SUBJECT TO FRICTION
Filed Dec. 21, 1964

INVENTOR.
WALTER BAIST
BY

United States Patent Office 3,358,495
Patented Dec. 19, 1967

3,358,495
APPARATUS FOR MEASURING THE WEAR ON SURFACES SUBJECT TO FRICTION
Walter Baist, Rheine, Germany, assignor to Wintershall Aktiengesellschaft, Kassel, Germany
Filed Dec. 21, 1964, Ser. No. 420,069
Claims priority, application Germany, Jan. 18, 1964, W 34,220
6 Claims. (Cl. 73—7)

This invention relates to testing machinery and is particularly concerned with a device for testing materials for wear resistance and for testing lubrication for efficiency and the like.

It is known to measure wear and lubricating efficiency by pressing together a pair of relatively movable members, such as a cylindrical or conical friction pin against a rotating disc. The wear on the pin can be determined after it has been held against the rotating disc for a certain length of time by removing the pin and measuring either the length or diameter of the pin. When testing a lubricant, the lubricant is fed to the region of frictional engagement of the pin and disc, and the efficiency of the lubricant is determined in the same manner.

A particularly difficult problem to be dealt with in these matters is that once the pin is removed for measuring, it can never be replaced in exactly the same position so that duplication of the test conditions are extremely difficult if not impossible. Furthermore, it has been found that when the pin is cylindrical, it must have a minimum diameter of about 5 millimeters to avoid bending and vibration thereof. When the pressure pin is conical, the difficulty presents itself that the cross sectional area of the pin changes at it wears.

It has thus not been possible heretofore to obtain tests based on extremely small rubbing surfaces and heretofore there has not been available any structure for exactly duplicating test conditions when measurements are to be taken.

The present invention has as its primary object the provision of a structure in which the drawbacks referred to above are eliminated.

Another object of this invention is the provision of a simple structure in which rubbing tests and lubrication tests can be carried out and test conditions can be duplicated at any time.

A still further object of this invention is the provision of a testing structure of the nature referred to in which several different lubricating media can be tested in one and the same setup with exact duplication of the testing conditions each time.

Figure 1:
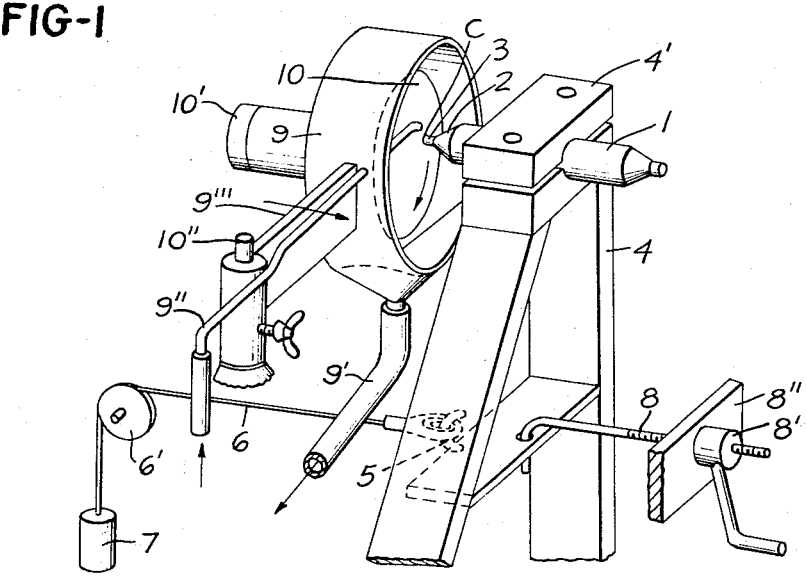
Figure 2:
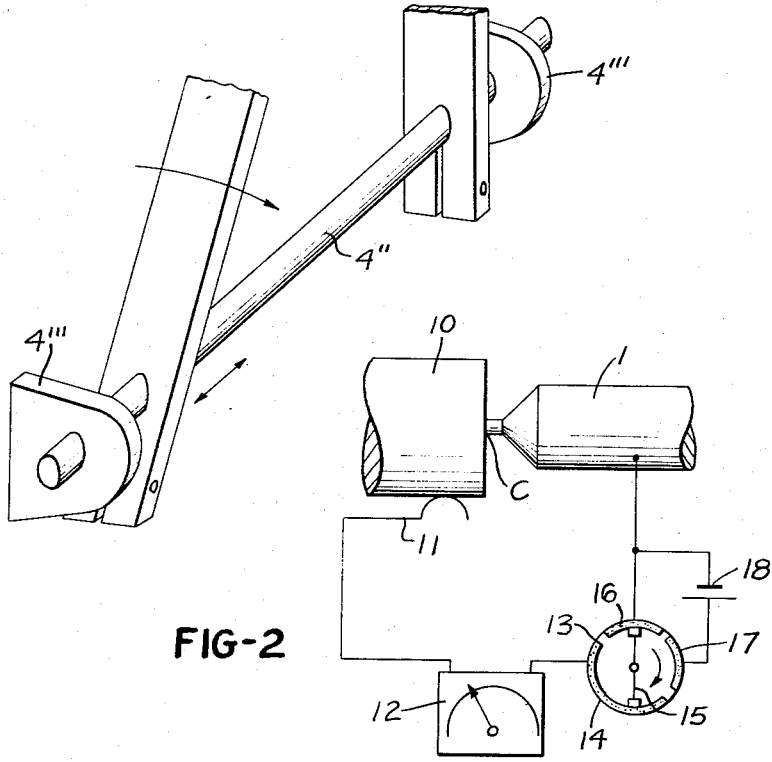

These and other objects and advantages of this invention will become more apparent upon reference to the following specification taken in connection with the accompanying drawings, in which:

FIGURE 1 is a perspective view showing a structure for carrying out tests according to the present invention, and FIGURE 2 is a somewhat schematic view showing the manner in which electrical measurements can be taken for effecting the indication of certain test results.

In general, the structure of the present invention comprises an arrangement for supporting and rotating a test member against which a pin is to be pressed. The structure further comprises a frame supporting the pin and tiltable to bring it into engagement with the rotating member under conditions of controlled pressure and with the frame being adjustably supported to control the distance of the point of engagement of the pin with the member from the center of rotation of the member. Furthermore, associated with the rotating member is a means for supplying lubricant to the region where the member is contacted by the pin, said arrangement being easily removable so that it can be replaced by another such arrangement containing another type lubricant.

Still further, the present invention proposes the provision of a special type pin having a relatively large diameter body part, tapering inwardly at at least one end and terminating in a relatively short projection. The short cylindrical terminal projection is that portion of the pin which engages the rotating member, and this portion of the pin is quite short and is so supported by the heavy body part and the conical transition portion between the body part and the pin, and that even quite small terminal portions can be employed without this portion of the pin vibrating or bending. By this device of the pin the heat developed by friction is derived from cylindrical terminal to the large diameter body part, so that high load can be provided without welding of the pin with the rotating member.

Referring to the drawings somewhat more in detail, the rubbing pin comprises a relatively large diameter cylindrical body part 1 having at at least one end a cylindrical extension 3 joined to the body part by a conical transition section 2 of the pin. Body part 1 may have a length of about 50 to 100 millimeters and a diameter of about 10 to 15 millimeters. The conical transition section 2 has an included angle between its sides of about 100 to 150° while cylindrical extension 3 may have a diameter of from 0.6 to 6.0 millimeters, preferably within the range of about 0.6 to 2.0 millimeters and with the length of the said cylindrical portion being about equal to the diameter thereof whereby to obtain a high degree of stiffness within the said cylindrical portion.

The pin is clamped along a substantial portion of the length of the body thereof to the upper end of a triangular frame 4 by the clamping block 4'. The frame is made up of two legs that diverge toward the bottom of the frame, and these legs are interconnected by a shaft 4" tiltably mounted in bearings 4'''. The mounting of frame 4 permits it to be tilted toward and away from rotating member 10 which is to be engaged by cylindrical extension 3 of the pin.

Preferably, the plane containing the surface of member 10 that cylindrical extension 3 engages also contains the axis of shaft 4" so that tilting movements of the frame 4 will cause extension 3 to move normal to the surface of member 10 at the time that the extension is engaging the said surface.

Frame 4 is provided with a hook 5 to which is connected a cable 6 that passes over a pulley 6' and is connected to a counterweight 7 by means of which any desired pressure can be caused to be developed between extension 3 and the surface of member 10.

The frame also has hooked thereto a threaded rod 8 which carries an adjusting nut 8' that serves as a stop when it engages abutment 8". Nut 8' is backed off to permit weight 7 to pull frame A toward disc 10 and can, if desired, be used to limit the pressure of the pin on the disc.

The provision of the threaded rod 8 permits the pin to be moved into engagement with the disc slowly with the assurance that no impact therebetween will occur which right distort the rubbing surfaces and detract from the accuracy of the results.

Associated with the rotating member 10 is a drive motor 10' therefor to drive the member at the desired rate of speed. Motor 10' may be adjustable in speed if so desired. Surrounding member 10 is a device 9 which will catch lubricant drawn off from member 10 and permit it to drain off through a conduit 9'. Lubricant is supplied to the point where extension 3 engages member 10 by way of a tube 9" supplied from a source of lubrication. The device 9 comprises a support arm 9''' pivotally mounted on a post 10" so that device 9 can be swung into and out of operative position whereby a plurality of the device 9 can be employed containing, for example, different lubricants. In this way a plurality of different type lubricants can be tested in one and the same set up without any change whatsoever in the conditions pertaining at the point where extension 3 engages member 10.

The entire frame 4 is, of course, tiltable outwardly to separate the rubbing point from member 10 and likewise the frame is movable in the direction of the axis of shaft 4" to adjust the radial position of the rubbing point relative to member 10.

The flat ended rubbing point according to the present invention is superior to spherical members held against a friction surface for checking lubricants because, with a spherical member, fresh oil does not always reach the friction surfaces and erratic measurements will result. Furthermore, spherical members, similarly to conical members have the disadvantage that the area of contact changes due to wear.

With regard to the sliding speeds that might be employed, this can be varied from about 0.5 to 20.0 meters per second either by adjusting the speed of rotation of the disc or the radical position of the rubbing on the rotary member. For example, with member 10 rotating at about 1500 r.p.m. and with the contact path of about 10 millimeters diameter, the sliding speed will be about 0.8 meter per second. If the speed of rotation of member 10 is 3000 r.p.m. and the diameter of the contact path is 45 millimeters, then the speed at the friction point is about 7.0 meters per second.

The arrangement of the present invention adapts itself to the effecting of electrical measurement of conditions at the rubbing point. For taking such measurements the contact pin is electrically insulated from the rotating member. This could be done by providing electrical insulating bushings and support mounts in the proper regions according to well known practices.

A circuit for effecting electrical measurements is shown in FIGURE 2 wherein a contact element 11 engages member 10 and is connected to one terminal of an indicating electric meter 12. The other terminal of the meter is connected to arcuate contact strip 14 of a motor switch 13 that has a rotating contact arm 15 having brushes on its opposite ends. Switch 13 includes a second arcuate contact strip 16 electrically connected to pin 1. Still a third arcuate strip 17 is included in switch 13, and between strips 16 and 17 is connected a battery 18. Switch arm 15 extends diametrically in the switch and strip 14 is about equal in circumferential extent to strips 16 and 17.

As arm 15 rotates meter 12 is first connected across contact point C and measures thermoelectric voltage thereacross. At this time arm 15 connects strips 16 and 14. Further rotation of arm 15 will connect strips 14 and 17, and at this time, voltage of battery 18 is connected in series circuit with contact point C and meter 12 and the resistance of contact point C can thus be measured.

If the surface of the pin and the rotating member are metallical bright a thermoelectric voltage, such as is developed in a thermocouple, will be obtained only with metals of different thermoelectrical behavior, whereas after the formation of an oxide layer on one of the friction surfaces, with any kind of metal, a thermoelectric voltage will be developed and the effect of oxide layer on thermoelectric voltage and resistance can be observed. If the oxide-layer builds up on the pin, the thermoelectric voltage drops, and if the oxide layer develops on the surface of the rotating member the thermoelectric-voltage rises and in both cases the resistance rises. If the oxide layers disappear, the opposite observation can be made. For this reason, with every metal, it is convenient to observe the formation or existance of oxide-layers by electrical measurement.

It will be understood that this invention is susceptible to modification in order to adapt it to different usages and conditions; and accordingly, it is desired to comprehend such modifications within this invention as may fall within the scope of the appended claims.

What is claimed is:

1. An apparatus for the measurement of wear and friction effects between rubbing surfaces comprising; a disc member driven in rotation on a predetermined axis and having a rubbing surface in a plane normal to said axis, a frame adjacent said disc member and tiltable toward and away from said disc member, a flat ended cylindrical pin carried by the frame adapted for being brought into endwise engagement with said surface of said disc member by tilting of the frame, means biasing the frame toward said disc member, means for supplying lubricant to the region of engagement of the flat end of said pin with said surface of said disc member, said pin and disc being formed of electrically conductive materials whereby upon the development of a reaction layer on at least one of said pin and the surface of the disc member in the region of engagement therebetween, a thermoelectric voltage will be developed at said region when the disc member rotates, and means having electrical connections to said disc member and said pin and operable for measuring the electrical resistance of the region of engagement therebetween and also the thermoelectric voltage developed across said region.

2. An apparatus for the measurement of wear and friction effects between rubbing surfaces comprising; a disc member driven in rotation on an axis and having a rubbing surface normal to said axis, a frame adjacent said disc member pivoted substantially in the plane of said surface for tilting movement toward and away from said disc member, a flat ended cylindrical rubbing pin carried by the frame moveable toward and away from said surface by tilting of said frame and held in the frame so as to be presented endwise to said surface, means biasing said frame toward said disc member to bring the flat end of said pin into rubbing engagement with said surface, means for supplying lubricant to the region of engagement of the flat end of said pin with said surface, said pin and disc being formed of electrically conductive materials whereby upon the development of a reaction layer on at least one of said pin and the surface of the disc member in the region of engagement therebetween, a thermoelectric voltage will be developed at said region when the disc member rotates, a source of direct current, an indicating electric meter in series with said source, connections from said meter and source to said disc member and pin respectively, and switch means interposed between said source and said meter adjustable for selectively connecting said meter in series with said source for measurement of the electrical resistance between the pin and disc member or for by-passing said source for measurement of the thermoelectric voltage between the pin and disc member.

3. An apparatus according to claim 2 in which said means for supplying lubricant to said region of engagement of said pin with said disc member comprises means moveable independently of said disc member whereby the particular lubricant being supplied can be changed without changing the relationship of said disc member and said pin.

4. An apparatus according to claim 3 in which said frame is adjustable in a direction parallel to said surface whereby the distance of the region of engagement of the pin with the rubbing surface of the disc member from the center of rotation of the disc member can be adjusted.

5. An apparatus according to claim 4 in which variable speed means are provided for driving said member in rotation.

6. A method of measuring conditions in the area of engagement of a flat ended cylindrical rubbing pin with a rotating member and wherein the pin and at least the surface portion of said member are formed of electrically conductive materials and wherein a reaction layer is developed at the area of contact of said pin and surface portion of said member on at least one thereof as said member rotates which comprises; rotating the member, pressing the pin endwise in the direction of its axis against said surface portion of said member, supplying lubricant to the area of engagement of said pin with said surface portion, electrically insulating the body of the pin from the said surface portion of said member, effecting electrical connection with said pin and with said surface portion of said member, and alternately measuring (1) the electrical resistance from the pin to the said surface portion of said surface member, and (2) the thermoelectric voltage developed between the pin and the said surface portion of said member.

References Cited

UNITED STATES PATENTS

| | | | |
|---|---|---|---|
| 1,386,087 | 8/1921 | Blankenhorn | 73—7 |
| 1,435,314 | 11/1922 | Vercombe | 73—7 |
| 2,097,716 | 11/1937 | Benz | 73—10 |
| 2,808,563 | 10/1957 | Hornbostel | 73—10 XR |
| 3,129,580 | 4/1964 | Furey et al. | 73—10 |

DAVID SCHONBERG, *Primary Examiner.*